US012639594B2

(12) United States Patent
Firmin et al.

(10) Patent No.: US 12,639,594 B2
(45) Date of Patent: May 26, 2026

(54) INTEGRATED FEATURE ENGINEERING

(71) Applicant: Alteryx, Inc., Irvine, CA (US)

(72) Inventors: Sydney Marie Firmin, Westminster, CO (US); James Max Kanter, Boston, MA (US); Kalyan Kumar Veeramachaneni, Watertown, MA (US)

(73) Assignee: Alteryx, Inc., Irvine, CA (US)

( * ) Notice: Subject to any disclaimer, the term of this patent is extended or adjusted under 35 U.S.C. 154(b) by 1021 days.

(21) Appl. No.: 17/137,720

(22) Filed: Dec. 30, 2020

(65) Prior Publication Data

US 2022/0207391 A1 Jun. 30, 2022

(51) Int. Cl.
*G06N 5/04* (2023.01)
*G06N 20/00* (2019.01)

(52) U.S. Cl.
CPC .............. *G06N 5/04* (2013.01); *G06N 20/00* (2019.01)

(58) Field of Classification Search
CPC .................................. G06N 5/04; G06N 20/00
See application file for complete search history.

(56) References Cited

U.S. PATENT DOCUMENTS

| | | | | |
|---|---|---|---|---|
| 2018/0018533 A1* | 1/2018 | Taranta, II | .......... | G06F 3/04883 |
| 2019/0171428 A1* | 6/2019 | Patton | ....................... | G06F 8/60 |
| 2020/0210430 A1* | 7/2020 | Shen | ..................... | G06F 16/221 |
| 2020/0225655 A1 | 7/2020 | Cella et al. | | |

OTHER PUBLICATIONS

Miwa, "Entity-Focused Sentence Simplification for Relation Extraction", 2010 (Year: 2010).*
PCT International Search Report and Written Opinion, PCT Application No. PCT/US21/63895, Mar. 25, 2022, 16 pages.
21916211.2 , "EP Search Report", EP Application No. 21916211.2, Nov. 12, 2024, 8 pages.
3203726 , "Foreign Office Action", CA Application No. 3203726, Oct. 15, 2024, 3 pages.
Smith, Micah , et al., "The Machine Learning Bazaar: Harnessing the ML Ecosystem for Effective System Development", SIGMOD'20, Portland OR, Jun. 14, 2020, 16 pages.
"Foreign Office Action", IN Application No. 202317046577, Apr. 8, 2025, 10 pages.
"Foreign Office Action", CA Application No. 3203726, Jun. 20, 2025, 3 pages.

* cited by examiner

*Primary Examiner* — Van C Mang
(74) *Attorney, Agent, or Firm* — FIG. 1 Patents

(57) ABSTRACT

A feature engineering application receives a plurality of data sets from different data sources for training a model for making a prediction based on new data. The feature engineering application generates primitives based on the data sets. A primitive is to be applied to a variable in the data sets to synthesize a feature. The feature engineering application also receives a temporal parameter that specifies a temporal value for generating time-based features. After the primitives are generated and the temporal parameter is received, the feature engineering application aggregates the plurality of data entities based on primary variables in the plurality of data entities and generate an entity set based on the aggregation. The feature engineering application then synthesize features, including the time-based features, based on the entity set, at least some of the primitives, and the temporal parameter.

20 Claims, 6 Drawing Sheets

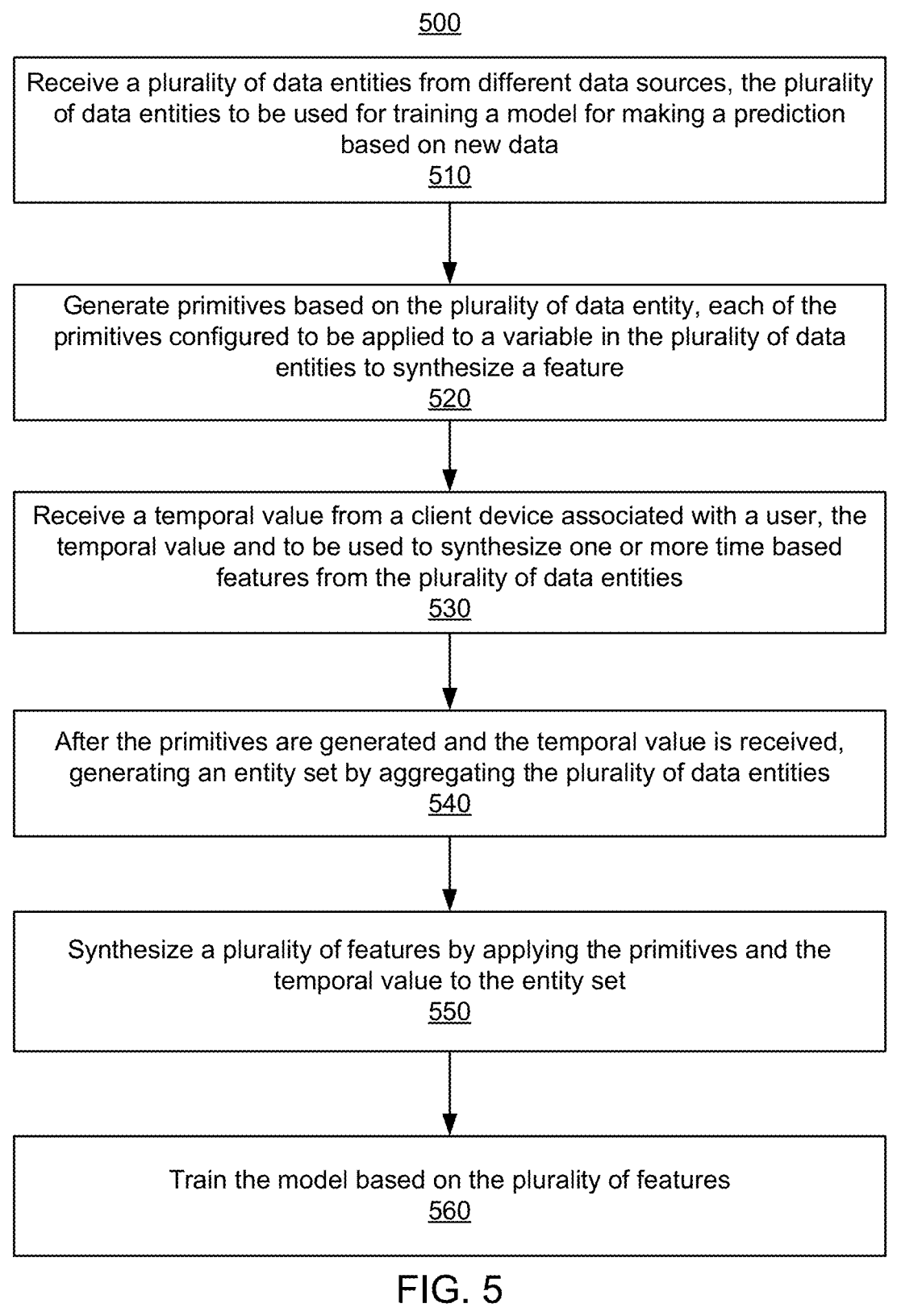

Receive a plurality of data entities from different data sources, the plurality of data entities to be used for training a model for making a prediction based on new data
510

Generate primitives based on the plurality of data entity, each of the primitives configured to be applied to a variable in the plurality of data entities to synthesize a feature
520

Receive a temporal value from a client device associated with a user, the temporal value and to be used to synthesize one or more time based features from the plurality of data entities
530

After the primitives are generated and the temporal value is received, generating an entity set by aggregating the plurality of data entities
540

Synthesize a plurality of features by applying the primitives and the temporal value to the entity set
550

Train the model based on the plurality of features
560

FIG. 5

INTEGRATED FEATURE ENGINEERING

BACKGROUND

Field of Art

The described embodiments pertain in general to processing data streams, and in particular to integrated feature engineering, in which automated feature engineering is integrated with entity set creation, for performing machine learning on data in the streams.

Description of the Related Art

Feature engineering is the process of identifying and extracting predictive features in complex data typically analyzed by businesses and other enterprises. Features are key to the accuracy of prediction by machine learning models. Therefore, feature engineering is often the determining factor in whether a data analytics project is successful. Feature engineering is usually a time-consuming process and typically require a large amount of data to achieve good prediction accuracy. Often times, the data used to create features are from different sources, which requires data combination before feature engineering. However, there have been architectural challenges with data movement between tools for combining data and tools for creating feature, causing the process of creating features to be even more time-consuming. Additionally, the architectural challenges make it more difficult for data analytics engineers to interact with the feature creation process. Thus, the current feature engineering tools fail to efficiently serve data processing needs of enterprises.

SUMMARY

The above and other issues are addressed by a method, computer-implemented system, and computer-readable memory. An embodiment of the method includes receiving a plurality of data entities from different data sources. The plurality of data entities are to be used for training a model for making a prediction based on new data. The method further includes generating primitives based on the plurality of data entity. Each of the primitives configured to be applied to a variable in the plurality of data entities to synthesize a feature. The method further includes receiving a temporal parameter from a client device associated with a user. The temporal parameter specifies a temporal value and is to be used to synthesize features from the plurality of data entities. The method further includes after the primitives are generated and the temporal parameter are received, generating an entity set by aggregating the plurality of data entities. The method further includes synthesizing a plurality of features based on the entity set, the primitives, and the temporal parameter. The method also includes training the model based on the plurality of features.

An embodiment of the computer-implemented system includes a computer processor for executing computer program instructions. The system also includes a non-transitory computer-readable memory storing computer program instructions executable by the computer processor to perform operations. The operations include receiving a plurality of data entities from different data sources. The plurality of data entities are to be used for training a model for making a prediction based on new data. The operations further include generating primitives based on the plurality of data entity. Each of the primitives configured to be applied to a variable in the plurality of data entities to synthesize a feature. The operations further include receiving a temporal parameter from a client device associated with a user. The temporal parameter specifies a temporal value and is to be used to synthesize features from the plurality of data entities. The operations further include after the primitives are generated and the temporal parameter are received, generating an entity set by aggregating the plurality of data entities. The operations further include synthesizing a plurality of features based on the entity set, the primitives, and the temporal parameter. The operations also include training the model based on the plurality of features.

An embodiment of the non-transitory computer-readable memory stores executable computer program instructions. The instructions are executable to perform operations. The operations include receiving a plurality of data entities from different data sources. The plurality of data entities are to be used for training a model for making a prediction based on new data. The operations further include generating primitives based on the plurality of data entity. Each of the primitives configured to be applied to a variable in the plurality of data entities to synthesize a feature. The operations further include receiving a temporal parameter from a client device associated with a user. The temporal parameter specifies a temporal value and is to be used to synthesize features from the plurality of data entities. The operations further include after the primitives are generated and the temporal parameter are received, generating an entity set by aggregating the plurality of data entities. The operations further include synthesizing a plurality of features based on the entity set, the primitives, and the temporal parameter. The operations also include training the model based on the plurality of features.

BRIEF DESCRIPTION OF DRAWINGS

FIG. 3 illustrates a user interface allowing user input for primitive and temporal parameter according to one embodiment.

FIG. 5 is a flow chart illustrating a method of synthesizing features by using data entities received from different data sources according to one embodiment.

The figures depict various embodiments for purposes of illustration only. One skilled in the art will readily recognize from the following discussion that alternative embodiments of the structures and methods illustrated herein may be employed without departing from the principles of the embodiments described herein. Like reference numbers and designations in the various drawings indicate like elements.

DETAILED DESCRIPTION

Figure 1:
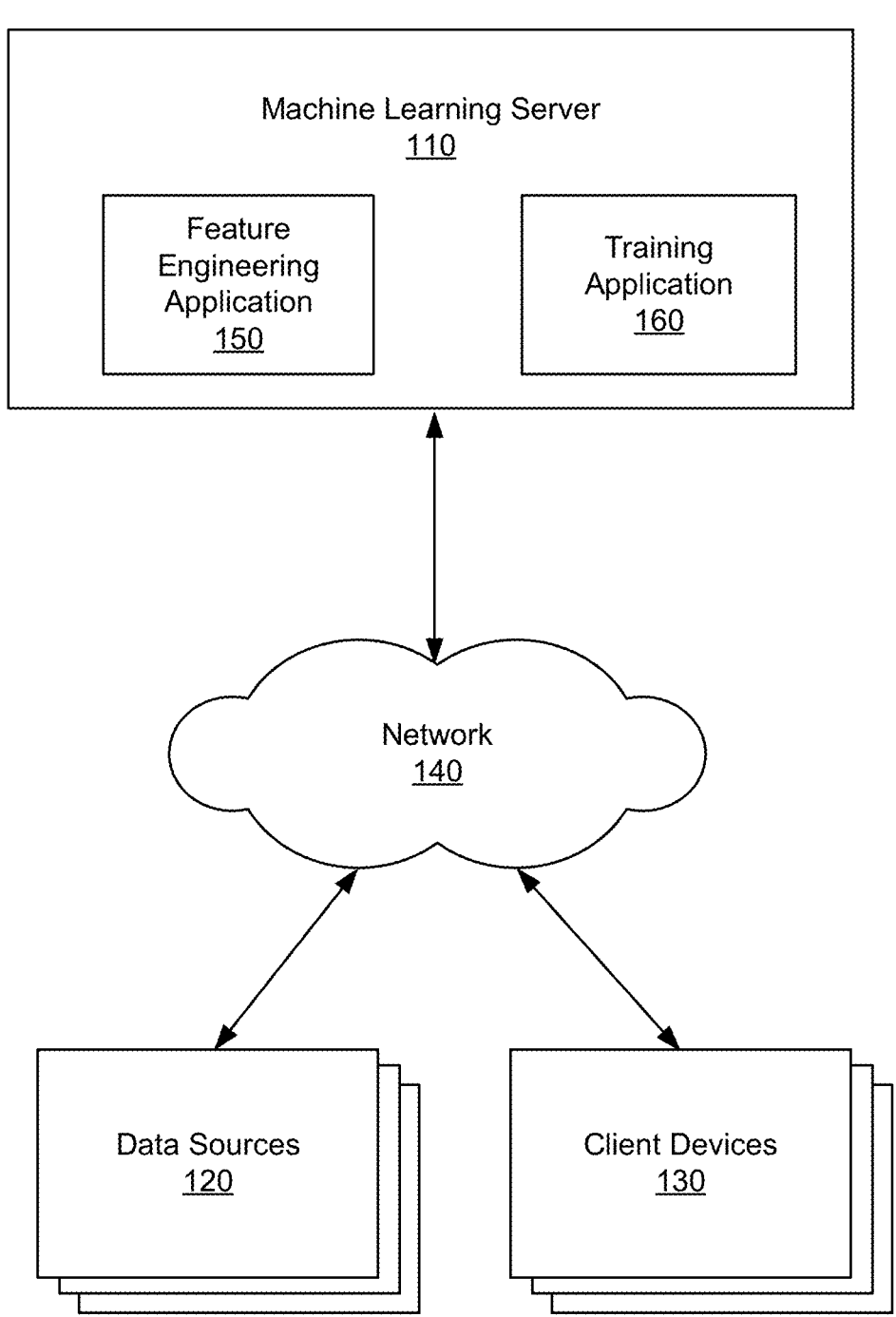
FIG. 1 is a block diagram illustrating a machine learning environment including a machine learning server according to one embodiment.

FIG. 1 is a block diagram illustrating a machine learning environment 100 including a machine learning server 110 according to one embodiment. The environment 100 further includes multiple data sources 120 connected to the machine learning server 110 via a network 130. Although the illustrated environment 100 contains only one machine learning server 110 coupled to multiple data sources 120, embodiments can have multiple machine learning servers and a singular data source.

The data sources 120 provide electronic data to the data analytics system 110. A data source 120 may be a storage device such as a hard disk drive (HDD) or solid-state drive (SSD), a computer managing and providing access to multiple storage devices, a storage area network (SAN), a database, or a cloud storage system. A data source 120 may also be a computer system that can retrieve data from another source. Different data sources may be associated with different user, different organizations, or different divisions within a same organization. The data sources 120 may be remote from the machine learning server 110 and provide the data via the network 130. In addition, some or all data sources 120 may be directly coupled to the data analytics system and provide the data without passing the data through the network 130.

The data provided by the data sources 120 may be organized into data records (e.g., rows). Each data record includes one or more values. For example, a data record provided by a data source 120 may include a series of comma-separated values. The data describe information of relevance to an enterprise using the data analytics system 110. For example, data from a data source 120 can describe computer-based interactions (e.g., click tracking data) with content accessible on websites and/or with applications. The enterprise can be in one or more of various industries, such as computer technology and manufacturing.

The machine learning server 110 is a computer-based system utilized for constructing machine learning models and providing machine learning models that can be used to make predictions based on data. Example predictions include application monitoring, network traffic data flow monitoring, user action prediction, and so on. The data are collected, gathered, or otherwise accessed from multiple data sources 120 via the network 130. The machine learning server 110 can implement scalable software tools and hardware resources employed in accessing, preparing, blending, and analyzing data from a wide variety of data sources 120. The machine learning server 110 can be a computing device used to implement machine learning functions including feature engineering and modeling techniques described herein.

The machine learning server 110 can be configured to support one or more software applications, illustrated in FIG. 1 as a feature engineering application 150 and a training application 160. The feature engineering application 150 performs integrated feature engineering, in which automated feature engineering is integrated with entity set creation. The integrated feature engineering process starts with generating feature engineering algorithms and parameters from individual data entities, then proceeds to creating an entity set by combining the individual data entities, and further proceeds to extracting predictor variables, i.e., features, from data in the entity set. Each feature is a variable that is potentially relevant to a prediction (referred to as target prediction) that the corresponding machine learning model will be used to make.

The feature engineering application 150 generates primitives based on the individual data entities. In one embodiment, the feature engineering application 150 selects primitives from a pool of primitives based on the individual data entities. The pool of primitives is maintained by the feature engineering application 150. A primitive defines an individual computation that can be applied to raw data in a dataset to create one or more new features having associated values. The selected primitives can be applied across different kinds of data and stacked to create new calculations, as they constrain the input and output data types. The feature engineering application 150 allows a user (such as a data analytics engineer) to provide temporal values, which can be used later by the feature engineering application 150 to create time-based features. A time-based feature is a feature extracted from data associated with a particular time or time period. A time-based feature may be used to train a model for making a time-based prediction, such as a prediction for a particular time or time period.

After the feature engineering application 150 generates the primitives and receives the temporal parameter from the user, it combines the individual data entities and generates an entity set. In some embodiments, the feature engineering application 150 generates the entity set based on variables in the individual data entities. For instance, the feature engineering application 150 identifies two individual data entities that have a common variable, determines a parent-child relationship between them, and generates an intermediate data entity based on the parent-child relationship. The feature engineering application 150 combines the intermediate data entities to generate the entity set.

After the entity set is generated, the feature engineering application 150 synthesizes features by applying the primitives and temporal parameter to the data in the entity set. It then evaluates the features to determine the importance of respective features through an iterative process in which it applies a different portion of the data to the features in each iteration. The feature engineering application 150 removes some of the features in each iteration to obtain a subset of features that are more useful for the prediction than removed features. For each feature in the subset, the feature engineering application 150 determines an importance factor, e.g., by using random forests. The importance factor indicates how important/relevant the feature is to the target prediction. The features in the subset and their importance factors can be sent to the training application 160 to build a machine learning model.

Compared with conventional feature engineering tools, the architecture of feature engineering application 150 facilitates more efficient data processing and provides less complicated experience for users who can provide input to the feature engineering process. The feature engineering application 150 integrates the automated feature engineering and entity set creation in a way that it allows data inputs (either from data sources 120 or users) for both automated feature engineering and entity set creation at the beginning of the integrated process, which prevents requesting data in the middle of the process. This way, the feature engineering application 150 can operate efficiently as it does not need to wait for responses from other entities in the middle of its operation. It also provides a better experience for users, all the user inputs (including editing primitives and providing temporal parameter) at the beginning of the integrated feature engineering process. The users do not need to monitor the rest of the process. Therefore, it overcomes the challenges suffered by conventional feature engineering tools.

Another advantage of the feature engineering application 150 is that the use of primitives makes the feature engineering process more efficient than conventional feature engineering processes, in which features are extracted from raw data. Also, the feature engineering application 150 can evaluate a primitive based on the evaluation and importance factor of the feature(s) generated from the primitive. It can generate metadata describing the evaluation of the primitives and use the metadata to determine whether to select the primitive for different data or a different prediction problem. Conventional feature engineering processes could generate a great number of features (such as millions) without providing any guidance or solutions to engineer features faster and better. Yet another advantage of the feature engineering application 150 is that it does not require a large amount of data to evaluate the feature. Rather, it applies an iterative method to evaluate the features, where it uses a different portion of the data in each iteration.

The training application 160 trains a machine learning model with the features and the importance factors of the features that are received from the feature engineering application 150. Different machine learning techniques— such as linear support vector machine (linear SVM), boosting for other algorithms (e.g., AdaBoost), neural networks, logistic regression, naïve Bayes, memory-based learning, random forests, bagged trees, decision trees, boosted trees, or boosted stumps—may be used in different embodiments. The generated machine learning model, when applied to the features extracted from a new dataset (e.g., a dataset from the same or a different data source 120), makes the target prediction.

In some embodiments, the training application 160 validates predictions before deploying the trained model to the new dataset. For example, the training application 160 applies the trained model to a validation dataset to quantify the accuracy of the model. Common metrics applied in accuracy measurement include: Precision=TP/(TP+FP) and Recall=TP/(TP+FN), where precision is how many outcomes the model correctly predicted (TP or true positives) out of the total it predicted (TP+FP or false positives), and recall is how many outcomes the model correctly predicted (TP) out of the total number that actually occurred (TP+FN or false negatives). The F score (F-score=2*PR/(P+R)) unifies precision and recall into a single measure. In one embodiment, the training application 160 iteratively retrains the machine learning model until the occurrence of a stopping condition, such as the accuracy measurement indication that the machine learning model is sufficiently accurate, or a number of training rounds having taken place.

The network 130 represents the communication pathways between the machine learning server 110 and data sources 120. In one embodiment, the network 130 is the Internet and uses standard communications technologies and/or protocols. Thus, the network 130 can include links using technologies such as Ethernet, 802.11, worldwide interoperability for microwave access (WiMAX), 3G, Long Term Evolution (LTE), digital subscriber line (DSL), asynchronous transfer mode (ATM), InfiniBand, PCI Express Advanced Switching, etc. Similarly, the networking protocols used on the network 130 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc.

The data exchanged over the network 130 can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above.

Figure 2:
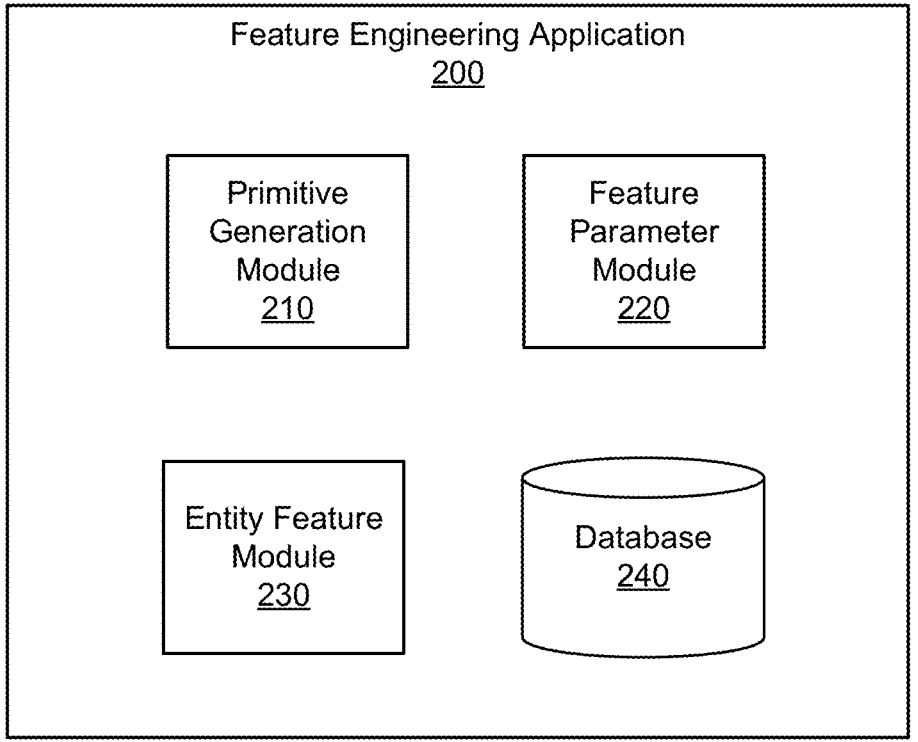
FIG. 2 is a block diagram illustrating a feature engineering application according to one embodiment.

FIG. 2 is a block diagram illustrating a feature engineering application 200 according to one embodiment. The feature engineering application 200 receives a plurality of data entities from different data sources and synthesizes features from the data entities. The feature engineering application 200 is an embodiment of the feature engineering application 150 in FIG. 1. The feature engineering application 200 includes a primitive generation module 210, a temporal parameter module 220, an entity feature module 230, a feature synthesis module 240, and a database 250. Those of skill in the art will recognize that other embodiments can have different and/or other components than the ones described here, and that the functionalities can be distributed among the components in a different manner.

The primitive generation module 210 generates a list of primitives based on the received data entities and allows a user to edit the list. In some embodiments, the primitive generation module 210 generates the list of primitives by selecting the primitives from a pool of primitives maintained by the feature engineering application 200 based on the data entities. In some embodiments, the primitive generation module 210 obtains information indicating one or more relationships between the data entities before it generates the list of primitives. The primitive generation module 210 selects the primitives in the list from the pool of primitives based on the data entities as well as the information indicating relationships between the data entities. The information may indicate one or more parent-child relationships between the data entities. The primitive generation module 210 may obtain the information by receiving the information from a user, or by determining the one or more parent-child relationships, e.g., by using the method described below in conjunction with the entity feature module 230.

The pool of primitives includes a large number of primitives, such as hundreds or thousands of primitives. Each primitive comprises an algorithm that when applied to data, performs a calculation on the data and generates a feature having an associated value. A primitive is associated with one or more attributes. An attribute of a primitive may be a description of the primitive (e.g., a natural language description specifying a calculation performed by the primitive when it is applied to data), input type (i.e., type of input data), return type (i.e., type of output data), metadata of the primitive that indicates how useful the primitive was in previous feature engineering processes, or other attributes.

In some embodiments, the pool of primitives includes multiple different types of primitives. One type of primitive is an aggregation primitive. An aggregation primitive, when applied to a dataset, identifies related data in the dataset, performs a determination on the related data, and creates a value summarizing and/or aggregating the determination. For example, the aggregation primitive "count" identifies the values in related rows in the dataset, determines whether each of the values is a non-null value, and returns (outputs) a count of the number of non-null values in the rows of the dataset. Another type of primitive is a transformation primitive. A transformation primitive, when applied to the dataset, creates a new variable from one or more existing variables in the dataset. For example, the transformation primitive "weekend" evaluates a timestamp in the dataset and returns a binary value (e.g., true or false) indicating whether the date indicated by the timestamp occurs on a weekend. Another exemplary transformation primitive evaluates a timestamp and returns a count indicating the number of days until a specified date (e.g., number of days until a particular holiday).

In some embodiments, the primitive generation module 210 uses a skim view approach, a summary view approach, or both approaches to select primitives based on the received data entities. In the skim view approach, the primitive generation module 210 identifies one or more semantic representations of each data entity. A semantic representation of a data entity describes a characteristic of the data entity and may be obtained without performing calculations on data in the data entity. Examples of semantic representations of the dataset include the presence of one or more particular variables (e.g., a name of a column) in the data entity, a number of columns, a number of rows, an input type of the data entity, other attributes of the data entity, and some combination thereof. To select a primitive using a skim view approach, the primitive generation module 210 determines whether an identified semantic representation of a data entity matches an attribute of a primitive in the pool. If there is a match, the primitive generation module 210 selects the primitive.

The skim view approach is a rule-based analysis. The determination of whether an identified semantic representation of a data entity matches an attribute of a primitive is based on rules maintained by the feature engineering application 200. The rules specify which semantic representations of data entity match which attributes of primitive, e.g., based on matching of keywords in semantic representations of data entity and in attributes of primitive. In one example, a semantic representation of the data entity is a column name "date of birth", the primitive generation module 210 selects a primitive whose input type is "date of birth," which matches the semantic representation of the dataset. In another example, a semantic representation of the dataset is a column name "timestamp," the primitive generation module 210 selects a primitive having an attribute indicating the primitive is appropriate for use with data indicating a timestamp.

In the summary view approach, the primitive generation module 210 generates a representative vector from the data entity. The representative vector encodes data describing the data entity, such as data indicating number of tables in the data entity, number of columns per table, average number of each column, and average number of each row. The representative vector thus serves as a fingerprint of the dataset. The fingerprint is a compact representation of the dataset and may be generated by applying one or more fingerprint functions, such as hash functions, Rabin's fingerprinting algorithm, or other types of fingerprint functions to the dataset.

The primitive generation module 210 selects primitives for the data entity based on the representative vector. For instance, the primitive generation module 210 inputs the representative vector of the data entity into a machine learned model. The machine learned model outputs primitives for the dataset. The machine learned model is trained, e.g., by the primitive selection module 210, to select primitives for datasets based on representative vectors. It may be trained based on training data that includes a plurality of representative vectors of a plurality of training data entities and a set of primitives for each of the plurality of training data entities. The set of primitives for each of the plurality of training data entities have been used to generate features determined useful for making a prediction based on the corresponding training dataset. In some embodiments, the machine learned model is continuously trained. For example, the primitive generation module 210 can further train the machine learned model based on the representative vector of the data entity and at least some of the selected primitives.

In some embodiments, the primitive generation module 210 generates primitives based also on input from a user (e.g., a data analytics engineer). The primitive generation module 210 provides the list of primitives, which are selected from the pool of primitives based on the data entities, for display in a user interface to the user. The user interface allows the user to edit primitives, such as to add other primitives to the list of primitives, create new primitives, remove primitives, perform other types of actions, or some combination thereof. The primitive generation module 210 updates the list of primitives based on the edits by the user. Accordingly, the primitives generated by the primitive generation module 210 incorporate the user's input. More details about the user information are described below in conjunction with FIG. 4.

The temporal parameter module 220 determines one or more cutoff times based on one or more temporal values. A cutoff time is a time at which to make the prediction. Data associated with time stamps before the cutoff time can be used to extract features for the label. However, data associated with time stamps after the cutoff time should not be used to extract features for the label. A cutoff time may be specific to a subset of the primitives generated by the primitive generation module 210 or be global to all the generated primitives. In some embodiments, the temporal parameter module 220 receives temporal values from users. A temporal value may be a timestamp or a time period. The temporal parameter module 220 allows the user to provide a different temporal value for different primitives or to provide a same temporal value for multiple primitives.

In some embodiments, the primitive generation module 210 and the temporal parameter module 220, separately or together, provide a graphical user interface (GUI) that allows users to edit primitives and to input temporal values. An example of the GUI offers a tool that allows users to view, search, and edit the primitives generated by the primitive generation module 210 and to provide one or more values of the temporal parameter for the primitives.

In some embodiments, the GUI allows the user to select how many data entities to use to synthesize features. The GUI provides users with options to control whether to use all or part of the data entities received by the feature engineering application 200 for feature synthesis. More details about the GUI are described in conjunction with FIG. 3.

The entity feature module 230 synthesizes features based on the data entities received from the feature engineering application 200, the primitives generated from the primitive generation module 210, and the cutoff times determined by the temporal parameter module 220. After the primitives are generated and the temporal parameter is received, the entity feature module 230 creates an entity set from the data entities received by the feature engineering application 200. In some embodiments, the entity feature module 230 determines variables in the data entities and identifies two or more data entities sharing a common variable as a subset. The entity feature module 230 may identify multiple subsets of data entity from the data entities received from the feature engineering application 200.

For each subset, the entity feature module 230 determines a parent-child relationship in the subset. It identifies a data entity in the subset as a parent entity and each of one or more other data entities in the subset as a child entity. In some embodiments, the entity feature module 230 determines the parent-child relationship based on primary variables of the data entities. A primary variable of a data entity is a variable having values that uniquely identify an entity (e.g., a user, an action, etc.). An example of a primary variable is a variable associated with identity information of users, identity information of actions, identity information of objects, or some combination thereof. The entity feature module 230 identifies a primary variable in each data entity and determines a hierarchy between the primary variables, e.g., by doing a rule-based analysis. The entity feature module 230 maintains rules that specify which variables are higher in a hierarchy than other variables. For instance, a rule specifies that a "user ID" variable has a higher position in the hierarchy than a "user action ID" variable.

In some embodiments, the entity feature module 230 determines the primary variable of a data entity based on user input. For example, the entity feature module 230 detects variables in the data entity, provides the detected variables for display to a user, and offers an opportunity for the user to identify which variable is the primary variable. As another example, the entity feature module 230 determines a primary variable and offers an opportunity for the user to confirm or disapprove the determination. The entity feature module 230 combines the data entities in the subset based on the parent-child relationship and generates an intermediate data entity. The entity feature module 230 may support a GUI facilitating user input. An example of the GUI is described below in conjunction with FIG. 5. In some embodiments, the entity feature module 230 determines the primary variable of a data entity without user input. For instance, the entity feature module 230 compares the variables in the data entity with variables in another data entity of comparable data types. Examples of data types include numerical data type, categorical data type, time series data type, textual data type, and so on. The entity feature module 230 determines a matching score for each variable in the data entity, the matching score indicates a probability of the variable matching a variable in the other data entity. The entity feature module 230 selects the variable in the data entity having the highest matching score as the primary variable of the data entity. Further, the entity feature module 230 combines the intermediate data entities and generates an entity set that incorporates all the data entities received by the feature engineering application 200.

In some embodiments, the entity feature module 230 determines whether to normalize a data entity, e.g., by determining whether there is more than one primary variable in the data entity. In one embodiment, the entity feature module 230 determines whether there are duplicate values of different variables in the data entity. For instance, if a "Colorado" value of a location variable always corresponds to a "Mountain" value of a region variable, the "Colorado" value and "Mountain" value are duplicate values. In response to a determination of normalizing the data entity, the entity feature module 230 normalizes the data entity by splitting the data entity to two new data entities. Each of the two new data entities includes a subset of the variables in the data entity. This process is referred to as normalization. In some embodiments of the normalization process, the entity feature module 230 identifies a first primary variable and a second primary variable from the variables in the given entity. Examples of the primary variable in a data entity include, e.g., identity information of users, identity information of actions, identity information of objects, or some combination thereof. The entity feature module 230 classifies the variables in the given entity into a first group of variables and a second group of variables. The first group of variables including the first primary variable and one or more other variables in the given entity that are related to the first primary variable. The second group of variables includes the second primary variable and one or more other variables in the given entity that are related to the second primary variable. The entity feature module 230 generates one of the two new entities with the first group of variables and values of the variables in the first group and generates the other one of the two new entities with the second group of variables and values of the variables in the first group. The entity feature module 230 then identifies the subsets of data entities from the two new data entities and the received data entities excluding the normalized data entity.

The entity feature module 230 applies the primitives and cutoff time(s) to the entity set to synthesize a group of features and an importance factor for each feature in the group. The entity feature module 230 extracts data from the entity set based on the cutoff times and synthesizes a plurality of features by applying the primitives to the extracted data. In some embodiments, the entity feature module 230 applies each of the selected primitives to at least a portion of the extracted data to synthesize one or more features. For instance, the entity feature module 230 applies a "weekend" primitive to a column named "timestamp" in the entity set to synthesize a feature indicating whether or not a date occurs on a weekend. The entity feature module 230 can synthesize a large number of features for the entity set, such as hundreds or even millions of features.

The entity feature module 230 evaluates the features and removes some of the features based on the evaluation to obtain the group of features. In some embodiments, the entity feature module 230 evaluates the features through an iterative process. In each round of the iteration, the entity feature module 230 applies the features that were not removed by previous iterations (also referred to as "remaining features") to a different portion of the extracted data and determines a usefulness score for each of the features. The entity feature module 230 removes some features that have the lowest usefulness scores from the remaining features.

In some embodiments, the entity feature module 230 determines the usefulness scores of features by using random forests. A usefulness score of a feature indicates how useful the feature is for a prediction made based on the entity set. In some embodiments, the entity feature module 230 iteratively applies a different portion of the entity set to the features to evaluate usefulness of the features. For instance, in the first iteration, the entity feature module 230 applies a predetermined percentage (such as 25%) of the entity set to the features to construct a first random forest. The first random forest includes a number of decision trees. Each decision tree includes a plurality of nodes. Every node corresponds to a feature and is includes a condition describing how to transit the tree through the node based on the value of the feature (e.g., take one branch if a date occurs on a weekend, and take another branch if not). The feature for each node is decided based on information gain or Gini impurity reduction. The feature that maximizes the information gain or reduction in Gini impurity is selected as the splitting feature. The evaluating module 320 determines an individual usefulness score of the feature based on either the information gain or reduction in Gini impurity due to the feature across the decision tree. The individual usefulness score of the feature is specific to one decision tree. After determining the individual usefulness scores of the feature for each of the decision trees in the random forest, the evaluating module 320 determines a first usefulness score of the feature by combining the individual usefulness scores of the feature. In one example, the first usefulness score of the feature is an average of the individual usefulness scores of the feature. The entity feature module 230 removes 20% of the features, which have the lowest first usefulness scores, so that 80% of the features are remaining. These features are referred to as the first remaining features.

In the second iteration, the entity feature module 230 applies the first remaining features to a different portion of the entity set. The different portion of the entity set can be 25% of the entity set that is different from the portion of the entity set used in the first iteration, or it can be 50% of the entity set that includes the portion of the entity set used in the first iteration. The evaluating module 320 constructs a second random forest using the different portion of the entity set and determines a second usefulness score for each of the remaining feature by using the second random forest. The entity feature module 230 removes 20% of the first remaining features and the rest of the first remaining features (i.e., 80% of the first remaining features form the second remaining features).

Similarly, in each following iteration, the entity feature module 230 applies the remaining features from the previous round to a different portion of the entity set, determines usefulness scores of the remaining features from the previous round, and removes some of the remaining features to obtain a smaller group of features. The entity feature module 230 can continue the iterative process until it determines that a condition is met. The condition can be that under a threshold number of features remain, the lowest usefulness score of the remaining features is above a threshold, the whole entity set has been applied to the features, a threshold number of rounds have been completed in the iteration, other conditions, or some combination thereof. The remaining features of the last round, i.e., features not removed by the entity feature module 230, are selected to train a machine learning model.

After the iteration is done and the group of features are obtained, the entity feature module 230 determines an importance factor for each feature in the group. The importance factor of a feature indicates how important the feature is for predicting the target variable. In some embodiments, the entity feature module 230 determines importance factors by using a random forest, e.g., one constructed based on at least a portion of the entity set. In some embodiments, the entity feature module 230 constructs a random forest based on the selected features and the entity set. The entity feature module 230 determines an individual ranking score of a selected feature based on each decision tree in the random forest and obtains an average of the individual ranking scores as the ranking score of the selected feature. The entity feature module 230 determines importance factors of the selected features based on their ranking scores. For instance, the entity feature module 230 ranks the selected features based on their ranking scores and determines that the importance score of the highest ranked selected feature is 1. The entity feature module 230 then determines a ratio of the ranking score of each of the rest of the selected features to the ranking score of the highest ranked selected feature as the importance factor of the corresponding selected feature.

In some embodiments, the entity feature module 230 adjusts the importance score of a feature by inputting the feature and a different portion of the entity set into the machine learning model. The machine learning model outputs a second importance score of the feature. The entity feature module 230 compares the importance factor with the second importance score to determine whether to adjust the importance factor. For example, the entity feature module

230 can change the importance factor to an average of the importance factor and the second importance factor.

Figure 3:
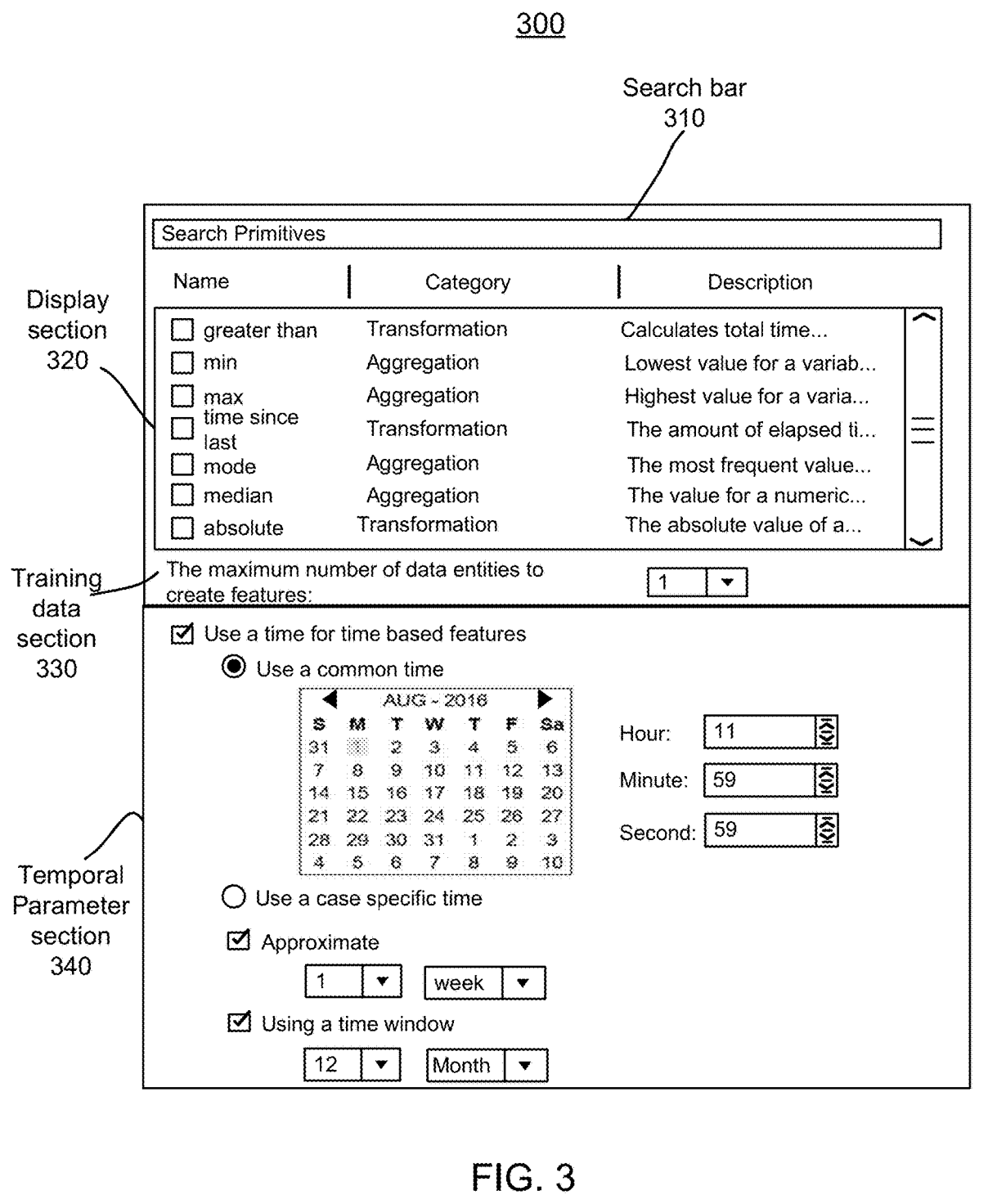

FIG. 3 illustrates a user interface 300 allowing user input for primitive and temporal parameter according to one embodiment. The user interface 300 is provided by the primitive generation module 210 and the temporal parameter module 220 of the feature engineering application 200. The user interface 300 allows users to view and interact with primitives that will be used to synthesize features. It also allows users to input values of the temporal parameter. The user interface 300 includes a search bar 310, a display section 320, a training data section 330, and a temporal parameter section 340. Other embodiments of the user interface 300 have more, fewer, or different components.

The search bar 310 allows the user to type in search terms to find primitives they would like to view or otherwise interact with. The display section presents 320 a list of primitives. It presents all the primitives selected by the primitive generation module 210 or primitives that match a search term input by the user. In some embodiments, the primitives are listed in an order based on, for example, importance of the primitives to the prediction, relevance of the primitives to the user's search term, or other factors. For each primitive in the list, the display section presents a name, category (aggregation or transformation), and description of the primitive. The name, category, and description describe the function and algorithm of the primitive and help the user understand the primitive. Each primitive in the list is associated with a check box that the user may click to select the primitive. Even though not shown in FIG. 3, the user interface 300 allows the user to remove selected primitives, add new primitives, change orders of primitives, or perform other types of interactions with primitives. The training data section 330 allows users to select the maximum number of data entities to be used to create features. This provides users opportunity to control amount of training data to be used to create features. The user interface allows the user to specify the trade off between processing time to generate the features and the quality of the features.

The temporal parameter section 340 provides options for users to input temporal values, e.g., specifying a time, defining a time window, or both. The temporal parameter section 340 also provides options for users to select whether to use a temporal value as a common time or a case specific time. A common time applies to all primitives that will be used to create features, versus a case specific time applies to a subset of the primitives.

Figure 4:
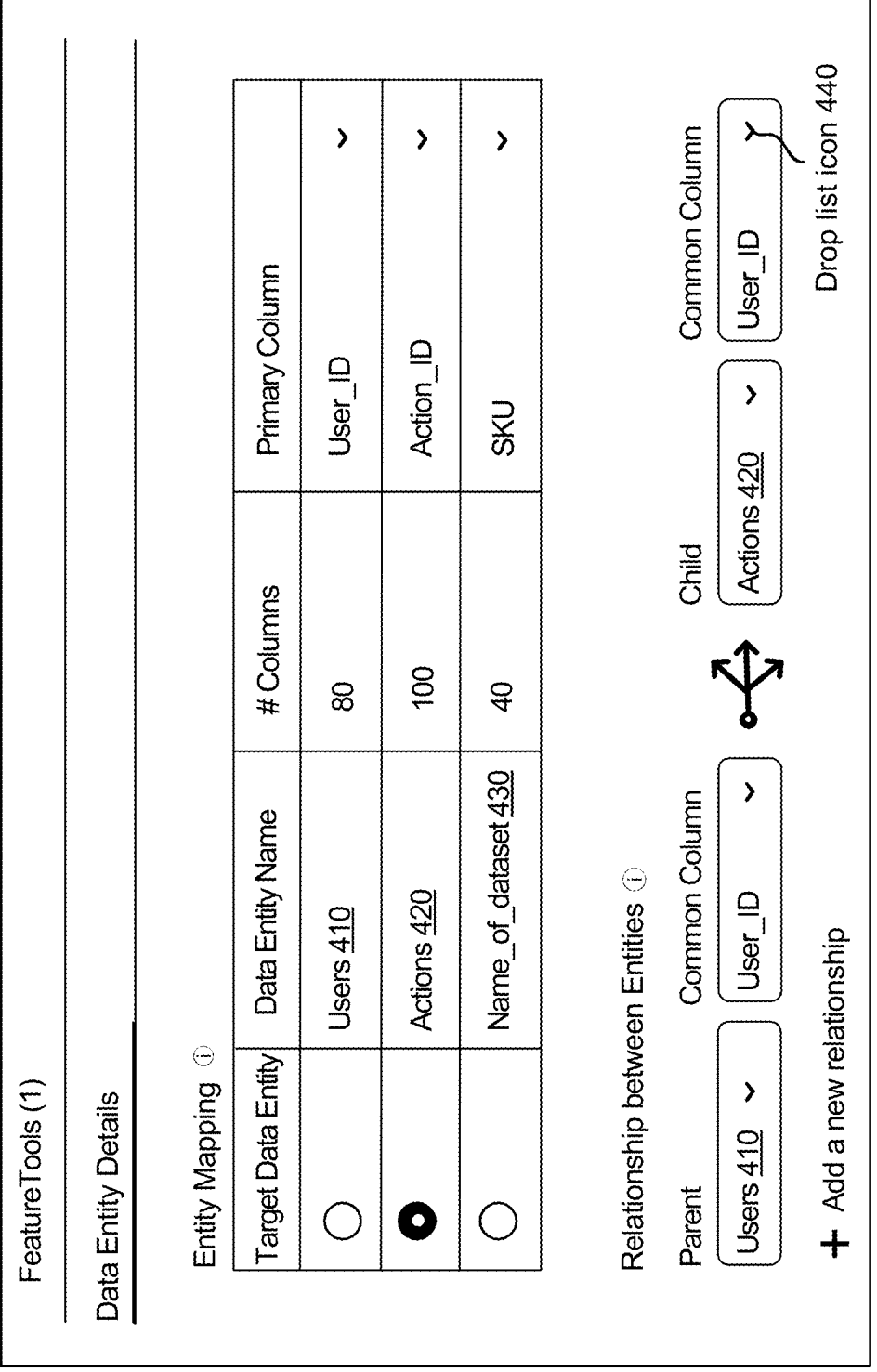
FIG. 4 illustrates a user interface for entity set creation according to one embodiment.

FIG. 4 illustrates a user interface 400 for entity set creation according to one embodiment. The user interface is provided by the entity feature module 230 of the feature engineering application 200. The user interface 400 displays data entities 410, 420, and 430 that have been received by the feature engineering application 200 to users. It also displays information of the data entities, such as data entity name, number of columns, and a primary key for each data entity. The data entity name helps users to identify the data entity. A column in the data entity corresponds to a variable, so the number of columns corresponds to the number of variables in the data entity and the primary column correspond to the primary variable. The user interface 400 further display a parent-child relationship between two data entities 410 and 420, and a common column shared by the two data entities. The data entity 410 is shown as the parent data entity, while the data entity 420 is shown as the child data entity. The user interface 400 provides dropdown icons 440 (individually referred to as dropdown icon 440) for each primary column and common column displayed in the user interface 400 to allow users to change the columns. For instance, in response to receiving a selection of a dropdown icon, the user interface 400 provides a list of candidate columns for the user and allows the user to select a different column. In some embodiments, the entity feature module 230 detects columns in the data entity and selects the candidate columns from the detected columns. The user interface 400 also allows a user to add a new relationship. Even though the user interface 400 shows three data entities and one parent-child relationship, it may include more data entities and more parent-child relationships. In some embodiment, a data entity is a parent in one parent but a child in a different subset.

FIG. 5 is a flow chart illustrating a method 500 of synthesizing features by using data entities received from different data sources according to one embodiment. In some embodiments, the method is performed by the machine learning server 110, although some or all of the operations in the method may be performed by other entities in other embodiments. In some embodiments, the operations in the flow chart are performed in different orders and include different and/or additional steps.

The machine learning server 110 receives 510 a plurality of data entities from different data sources. Different data sources may be associated with different users, different organizations, or different divisions within a same organization. The plurality of data entities are to be used for training a model for making a prediction based on new data. A data entity is a set of data that includes one or more variables. Example predictions include application monitoring, network traffic data flow monitoring, user action prediction, and so on.

The machine learning server 110 generates 520 primitives based on the plurality of data entities. Each of the primitives is configured to be applied to a variable in the plurality of data sets to synthesize a feature. In some embodiments, the machine learning server 110 selects the primitives from a pool of primitives based on the plurality of data entities. The machine learning server 110 may provide the selected primitives for display to users and allow the users to edit the selected primitives, such as adding, removing, or changing order of primitives. The machine learning server 110 generates the primitives based on its selection and user edit.

The machine learning server 110 receives 530 a temporal value from a client device associated with a user. The temporal value is to be used to synthesize one or more time-based features from the plurality of data entities. In some embodiments, the machine learning server 110 determines one or more cutoff times based on the temporal value and extracts data from the entity set based on the one or more cutoff times. The extracted data will be used by the machine learning server 100 to synthesize the one or more time-based features from the extracted data.

After the primitives are generated and the temporal value is received, the machine learning server 110 generates 540 an entity set by aggregating the plurality of data entities. The machine learning server 110 identifies subsets of data entities from the plurality of data sets. Each subset comprises two or more data entities that share a common variable. The machine learning server 110 then generates an intermediate data entity by aggregating the data entities in each subset. In some embodiments, the machine learning server 110 determines primary variable for each data entity in the subset and identifies a data entity in the subset as a parent entity and each of one or more other data entities in the parent as a child entity based on the primary variables of the data entities in the subset. The machine learning server 110 aggregates the data entities in the subset based on the parent-child relationship. The machine learning server 110 generates the entity set by aggregating the intermediate data entities.

In some embodiments, the machine learning server 110 generates two new data entities from a given data entity of the plurality of data entities based on variables in the given data entity. Each of the two new data entities includes a subset of the variables in the given data entity. For instance, the machine learning server 110 identifies a first primary variable and a second primary variable from the variables in the given entity. It then classifies the variables in the given entity into a first group of variables and a second group of variables. The first group of variables includes the first primary variable and one or more other variables in the given entity that are related to the first primary variable. The second group of variables includes the second primary variable and one or more other variables in the given entity that are related to the second t primary variable. The machine learning server 110 generates one of the two new entities with the first group of variables and values of the variables in the first group and generates the other one of the two new entities with the second group of variables and values of the variables in the first group. The machine learning server 110 identifies the subsets of data entities from the two new data entities and the plurality of data entities excluding the give data entity.

The machine learning server 110 synthesizes 550 a plurality of features by applying the primitives and the temporal value to the entity set. In some embodiments, the machine learning server 110 applies the primitives to the entity set to generate a pool of features. The machine learning server 110 then iteratively evaluates the pool of features to remove some features from the pool of features to obtain the plurality of features. In each iteration, the machine learning server 110 evaluates usefulness of at least some features of the plurality of features by applying a different portion of the entity set to the evaluated features, and removes some of the evaluated features based on the usefulness of the evaluated features to produce the plurality of features.

The plurality of features includes the one or more time-based features. In some embodiments, the machine learning server 110 determines one or more cutoff times based on the temporal value. The machine learning server 110 then extracts data from the entity set based on the one or more cutoff times and generates the one or more time-based features from the extracted data.

The machine learning server 110 trains 550 the model based on the plurality of features. The machine learning server 110 may use different machine learning techniques in different embodiments. Example machine learning techniques include such as linear support vector machine (linear SVM), boosting for other algorithms (e.g., AdaBoost), neural networks, logistic regression, naïve Bayes, memory-based learning, random forests, bagged trees, decision trees, boosted trees, boosted stumps, and so on. The trained model is then used to make predictions in view of a new dataset.

Figure 6:
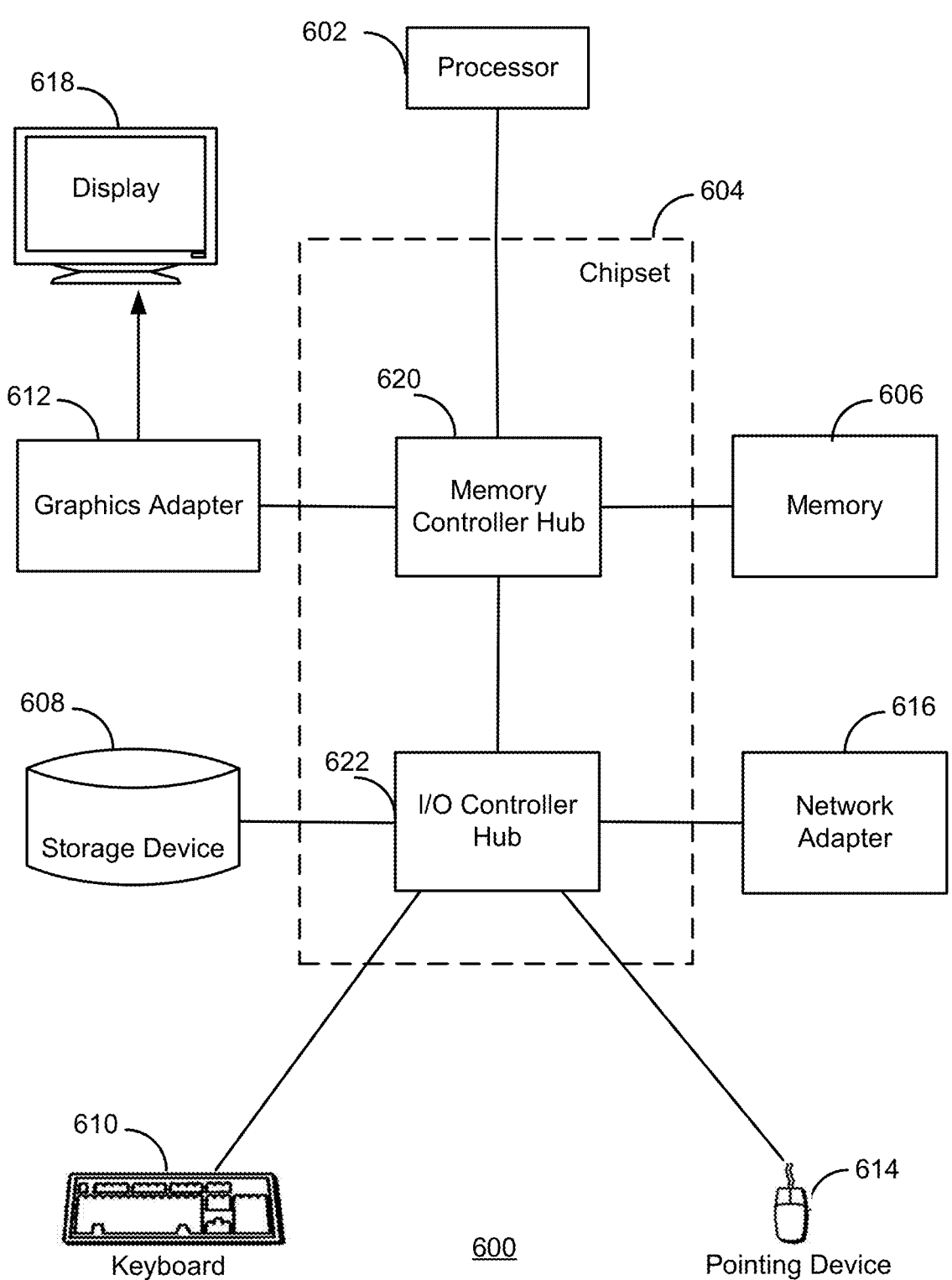
FIG. 6 is a high-level block diagram illustrating a functional view of a typical computer system for use as the machine learning server of FIG. 1 according to an embodiment.

FIG. 6 is a high-level block diagram illustrating a functional view of a typical computer system 600 for use as the machine learning server 110 of FIG. 1 according to an embodiment.

The illustrated computer system includes at least one processor 602 coupled to a chipset 604. The processor 602 can include multiple processor cores on the same die. The chipset 604 includes a memory controller hub 620 and an input/output (I/O) controller hub 622. A memory 606 and a graphics adapter 612 are coupled to the memory controller hub 620 and a display 618 is coupled to the graphics adapter 612. A storage device 608, keyboard 610, pointing device 614, and network adapter 616 may be coupled to the I/O controller hub 622. In some other embodiments, the computer system 600 may have additional, fewer, or different components and the components may be coupled differently. For example, embodiments of the computer system 600 may lack displays and/or keyboards. In addition, the computer system 600 may be instantiated as a rack-mounted blade server or as a cloud server instance in some embodiments.

The memory 606 holds instructions and data used by the processor 602. In some embodiments, the memory 606 is a random-access memory. The storage device 608 is a non-transitory computer-readable storage medium. The storage device 608 can be a HDD, SSD, or other types of non-transitory computer-readable storage medium. Data processed and analyzed by the machine learning server 110 can be stored in the memory 606 and/or the storage device 608.

The pointing device 614 may be a mouse, track ball, or other type of pointing device, and is used in combination with the keyboard 610 to input data into the computer system 600. The graphics adapter 612 displays images and other information on the display 618. In some embodiments, the display 618 includes a touch screen capability for receiving user input and selections. The network adapter 616 couples the computer system 600 to the network 160.

The computer system 600 is adapted to execute computer modules for providing the functionality described herein. As used herein, the term "module" refers to computer program instruction and other logic for providing a specified functionality. A module can be implemented in hardware, firmware, and/or software. A module can include one or more processes, and/or be provided by only part of a process. A module is typically stored on the storage device 608, loaded into the memory 606, and executed by the processor 602.

The particular naming of the components, capitalization of terms, the attributes, data structures, or any other programming or structural aspect is not mandatory or significant, and the mechanisms that implement the embodiments described may have different names, formats, or protocols. Further, the systems may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present features in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain embodiments described herein include process steps and instructions described in the form of an algorithm. It should be noted that the process steps and instructions of the embodiments could be embodied in software, firmware or hardware, and when embodied in software, could be downloaded to reside on and be operated from different platforms used by real time network operating systems.

Finally, it should be noted that the language used in the specification has been principally selected for readability and instructional purposes, and may not have been selected to delineate or circumscribe the inventive subject matter. Accordingly, the disclosure of the embodiments is intended to be illustrative, but not limiting.

We claim:

1. A method comprising:

receiving a plurality of data entities from different data sources;

generating a pool of primitives based on the plurality of data entities, the pool of primitives including hundreds of primitives and each primitive in the pool of primitives including an algorithm that, when applied to one of more of the plurality of data entities, synthesizes a feature having an associated value;

generating an entity set by aggregating the plurality of data entities;

synthesizing a plurality of features by:

generating a pool of features by applying the pool of primitives to the entity set;

updating the pool of features over a plurality of iterations, each of the plurality of iterations comprising:

determining a usefulness score for each feature in the pool of features using a portion of the entity set that is different from a portion of the entity set used in a different iteration; and removing at least one feature from the pool of features based on the usefulness scores; and outputting the updated pool of features as the plurality of features in response to a stopping condition; and generating a machine learning model that is configured to generate an output based on new data by:

training the machine learning model using the plurality of features;

applying the machine learning model to a validation dataset; and iteratively retraining the machine learning model until applying the machine learning model to the validation dataset achieves a threshold accuracy measurement.

2. The method of claim 1, wherein generating the entity set by aggregating the plurality of data entities comprises:

identifying subsets of data entities from the plurality of data entities, each subset of data entities comprising two or more data entities that share a common variable;

generating an intermediate data entity by aggregating data entities in each subset of data entities; and generating the entity set by aggregating the intermediate data entities.

3. The method of claim 2, wherein generating the intermediate data entity by aggregating the data entities in each of the subsets of data entities comprises:

determining a primary variable for each data entity in the subset of data entities; and identifying a data entity in the subset of data entities as a parent entity and each of one or more other data entities in the subset of data entities as a child entity based on the respective primary variable determined for each data entity in the subset of data entities.

4. The method of claim 2, wherein identifying the subsets of data entities from the plurality of data entities comprises:

generating two new data entities from a given data entity of the plurality of data entities based on variables defining the given data entity, each of the two new data entities including a subset of the variables defining the given data entity; and identifying the subsets of data entities from the plurality of data entities, excluding the given data entity, and the two new data entities.

5. The method of claim 4, wherein generating the two new entities from the given entity of the plurality of entities based on variables defining the given entity comprises:

identifying a first primary variable and a second primary variable from the variables defining the given entity;

classifying the variables defining the given entity into a first group of variables and a second group of variables, the first group of variables including the first primary variable and one or more other variables defining the given entity that are related to the first primary variable, the second group of variables including the second primary variable and one or more other variables defining the given entity that are related to the second primary variable;

generating one of the two new entities with the first group of variables and respective values of the first group of variables; and generating the other one of the two new entities with the second group of variables and respective values of the second group of variables.

6. The method of claim 1, wherein synthesizing the plurality of features by applying the pool of primitives to the entity set is based on a temporal value and further comprises:

determining one or more cutoff times based on the temporal value;

extracting data from the entity set based on the one or more cutoff times; and synthesizing the plurality of features from the extracted data.

7. A system, comprising:

a computer processor for executing computer program instructions; and a non-transitory computer-readable memory storing computer program instructions executable by the computer processor to perform operations comprising:

receiving a plurality of data entities from different data sources;

generating a pool of primitives based on the plurality of data entities, the pool of primitives including hundreds of primitives and each primitive in the pool of primitives including an algorithm that, when applied to one of more of the plurality of data entities, synthesizes a feature having an associated value;

generating an entity set by aggregating the plurality of data entities;

synthesizing a plurality of features by:

generating a pool of features by applying the primitives to the entity set;

updating the pool of features over a plurality of iterations, each of the plurality of iterations comprising:

determining a usefulness score for each feature in the pool of features using a portion of the entity set that is different from a portion of the entity set used in a different iteration; and removing at least one feature from the pool of features based on the usefulness scores; and outputting the updated pool of features as the plurality of features in response to a stopping condition; and generating a machine learning model that is configured to generate an output based on new data by:

training the machine learning model using the plurality of features;

applying the machine learning model to a validation dataset; and iteratively retraining the machine learning model until applying the machine learning model to the validation dataset achieves a threshold accuracy measurement.

8. The system of claim 7, wherein generating the entity set by aggregating the plurality of data entities comprises:

identifying subsets of data entities from the plurality of data entities, each subset of data entities comprising two or more data entities that share a common variable;

generating an intermediate data entity by aggregating data entities in each subset of data entities; and generating the entity set by aggregating the intermediate data entities.

9. The system of claim 8, wherein generating the intermediate data entity by aggregating the data entities in each of the subsets of data entities comprises:

determining a primary variable for each data entity in the subset of data entities; and identifying a data entity in the subset of data entities as a parent entity and each of one or more other data entities in the subset of data entities as a child entity based on the respective primary variable determined for each data entity in the subset of data entities.

10. The system of claim 8, wherein identifying the subsets of data entities from the plurality of data entities comprises:

generating two new data entities from a given data entity of the plurality of data entities based on variables defining the given data entity, each of the two new data entities including a subset of the variables defining the given data entity; and identifying the subsets of data entities from the plurality of data entities, excluding the given data entity, and the two new data entities.

11. The system of claim 10, wherein generating the two new entities from the given entity of the plurality of entities based on variables defining the given entity comprises:

identifying a first primary variable and a second primary variable from the variables defining the given entity;

classifying the variables defining the given entity into a first group of variables and a second group of variables, the first group of variables including the first primary variable and one or more other variables defining the given entity that are related to the first primary variable, the second group of variables including the second primary variable and one or more other variables defining the given entity that are related to the second primary variable;

generating one of the two new entities with the first group of variables and respective values of the first group of variables; and generating the other one of the two new entities with the second group of variables and respective values of the second group of variables.

12. The system of claim 7, wherein synthesizing the plurality of features by applying the pool of primitives to the entity set is based on a temporal value and further comprises:

determining one or more cutoff times based on the temporal value;

extracting data from the entity set based on the one or more cutoff times; and synthesizing the plurality of features from the extracted data.

13. A non-transitory computer-readable memory storing executable computer program instructions for processing data blocks in a data analytics system, the instructions executable to perform operations comprising:

receiving a plurality of data entities from different data sources;

generating a pool of primitives based on the plurality of data entities, the pool of primitives including hundreds of primitives and each primitive in the pool of primitives including an algorithm that, when applied to one of more of the plurality of data entities, synthesizes a feature having an associated value;

generating an entity set by aggregating the plurality of data entities;

synthesizing a plurality of features by:

generating a pool of features by applying the primitives to the entity set;

updating the pool of features over a plurality of iterations, each of the plurality of iterations comprising:

determining a usefulness score for each feature in the pool of features using a portion of the entity set that is different from a portion of the entity set used in a different iteration; and removing at least one feature from the pool of features based on the usefulness scores; and outputting the updated pool of features as the plurality of features in response to a stopping condition; and generating a machine learning model that is configured to generate an output based on new data by:

training the machine learning model using the plurality of features;

applying the machine learning model to a validation dataset; and iteratively retraining the machine learning model until applying the machine learning model to the validation dataset achieves a threshold accuracy measurement.

14. The non-transitory computer-readable memory of claim 13, wherein generating the entity set by aggregating the plurality of data entities comprises:

identifying subsets of data entities from the plurality of data entities, each subset of data entities comprising two or more data entities that share a common variable;

generating an intermediate data entity by aggregating data entities in each subset of data entities; and generating the entity set by aggregating the intermediate data entities.

15. The non-transitory computer-readable memory of claim 14, wherein generating the intermediate data entity by aggregating the data entities in each of the subsets of data entities comprises:

determining a primary variable for each data entity in the subset of data entities; and identifying a data entity in the subset of data entities as a parent entity and each of one or more other data entities in the subset of data entities as a child entity based on the respective primary variable determined for each data entity in the subset of data entities.

16. The non-transitory computer-readable memory of claim 14, wherein identifying the subsets of data entities from the plurality of data entities comprises:

generating two new data entities from a given data entity of the plurality of data entities based on variables defining the given data entity, each of the two new data entities including a subset of the variables defining the given data entity; and identifying the subsets of data entities from the plurality of data entities, excluding the given data entity, and the two new data entities.

17. The non-transitory computer-readable memory of claim 13, wherein synthesizing the plurality of features by applying the pool of primitives to the entity set is based on a temporal value and further comprises:

determining one or more cutoff times based on the temporal value;

extracting data from the entity set based on the one or more cutoff times; and synthesizing the plurality of features from the extracted data.

18. The non-transitory computer-readable memory of claim 13, wherein, during each of the plurality of iterations, determining the usefulness score for each feature in the pool of features is performed by:

constructing a random forest comprising decision trees with nodes representing different features in the pool of features; and applying the portion of the entity set that is different from the portion of the entity set used in the different iteration set to the random forest.

19. The method of claim 1, wherein, during each of the plurality of iterations, determining the usefulness score for each feature in the pool of features is performed by:

constructing a random forest comprising decision trees with nodes representing different features in the pool of features; and applying the portion of the entity set that is different from the portion of the entity set used in the different iteration set to the random forest.

20. The system of claim 7, wherein, during each of the plurality of iterations, determining the usefulness score for each feature in the pool of features is performed by:

constructing a random forest comprising decision trees with nodes representing different features in the pool of features; and applying the portion of the entity set that is different from the portion of the entity set used in the different iteration set to the random forest.

\* \* \* \* \*